(12) United States Patent
Erbes

(10) Patent No.: US 6,788,756 B2
(45) Date of Patent: Sep. 7, 2004

(54) JET PUMP SET SCREW WEDGE

(75) Inventor: John Geddes Erbes, Mt. View, CA (US)

(73) Assignee: General Electric Company, Schenectady, NY (US)

( * ) Notice: Subject to any disclaimer, the term of this patent is extended or adjusted under 35 U.S.C. 154(b) by 150 days.

(21) Appl. No.: 10/065,061

(22) Filed: Sep. 13, 2002

(65) Prior Publication Data

US 2004/0052325 A1 Mar. 18, 2004

(51) Int. Cl.$^7$ .............................................. G21C 15/00
(52) U.S. Cl. ...................... 376/372; 376/285; 376/260; 248/49
(58) Field of Search ........................... 376/285, 407, 376/372, 260; 81/415; 606/157; 269/156; 248/49

(56) References Cited

U.S. PATENT DOCUMENTS

| | | | | |
|---|---|---|---|---|
| 3,779,108 A | * | 12/1973 | Reiter .......................... | 81/424 |
| 4,468,172 A | * | 8/1984 | Dixon et al. ................. | 417/151 |
| 4,675,149 A | | 6/1987 | Perry et al. | |
| 4,714,229 A | * | 12/1987 | Force et al. ................. | 248/610 |
| 5,059,214 A | * | 10/1991 | Akopov et al. .............. | 606/207 |
| 5,752,807 A | | 5/1998 | Erbes | |
| 5,767,416 A | * | 6/1998 | Conard ........................ | 73/856 |
| 5,876,026 A | * | 3/1999 | Chen ........................... | 269/156 |
| 5,964,029 A | * | 10/1999 | Weems et al. ................ | 29/723 |
| 5,978,433 A | | 11/1999 | Erbes et al. | |
| 6,013,088 A | * | 1/2000 | Karavidas .................... | 606/157 |
| 6,052,425 A | | 4/2000 | Erbes et al. | |
| 6,233,301 B1 | | 5/2001 | Robergeau | |
| 6,320,923 B2 | * | 11/2001 | Wivagg et al. ............... | 376/407 |
| 6,435,839 B1 | | 8/2002 | Erbes | |
| 6,463,114 B1 | * | 10/2002 | Wivagg ....................... | 376/285 |

FOREIGN PATENT DOCUMENTS

JP   10-311893   * 11/1998

* cited by examiner

Primary Examiner—Michael J. Carone
Assistant Examiner—R. Palabrica
(74) Attorney, Agent, or Firm—Armstrong Teesdale LLP (57) ABSTRACT

A piping support wedge apparatus for a jet pump in a nuclear reactor is provided. In an exemplary embodiment, the wedge apparatus includes a first tapered wedge segment having a first end portion and a second end portion and a second tapered wedge segment having a first end portion and a second end portion. The first and second wedge segments are joined at the first ends portions to form a substantially U-shaped body. The wedge apparatus also includes a slot defined by an area between the first and second wedge segments and extending from the first end portions to the joined second end portions of the wedge segments.

10 Claims, 7 Drawing Sheets

JET PUMP SET SCREW WEDGE

BACKGROUND OF INVENTION

This invention relates generally to nuclear reactors and more particularly, to apparatus for repairing jet pump assemblies within a nuclear reactor pressure vessel.

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus located between the cylindrical reactor pressure vessel and the cylindrically shaped shroud.

In a BWR, hollow tubular jet pumps positioned within the shroud annulus provide the required reactor core water flow. The upper portion of the jet pump, known as the inlet mixer, is laterally positioned and supported against two opposing rigid contacts within restrainer brackets by a gravity actuated wedge. The restrainer brackets support the inlet mixer by attaching to the adjacent jet pump riser pipe. The purpose of the gravity actuated wedge is to maintain contact between the inlet mixer and the restrainer bracket. The wedge works in cooperation with two set screws which are tack welded to the restrainer bracket to maintain contact with the inlet mixer. The flow of water through the jet pumps typically includes pressure fluctuations that are caused by various sources in the reactor system. The pressure fluctuations can have frequencies close to one or more natural vibration modes of the jet pump piping. The jet pump piping stability depends on the tight fit-up, or contact, of the restrainer brackets and the inlet mixers. Operating thermal gradients, hydraulic loads, and fluctuations in the hydraulic loads can overcome the lateral support provided by the gravity wedge, allowing gaps or clearances to develop at the opposing two fixed contacts or set screws. Alternately, the set screw contacts may develop excessive clearances from wear or by damage from failure of other support components, such as the inlet mixer hold down beam. The loss of contact between the inlet mixer and the restrainer bracket can change the jet pump natural frequency to match some excitation frequency in the system, causing vibration of the piping and exerting increased loads which may cause cyclic fatigue cracking and wear of the piping supports, which can result in degradation from wear and fatigue at additional jet pump structural supports. When such conditions are discovered during plant shutdown, restoration of the tight fitup at the set screw contact locations must be accomplished by apparatus that can be fabricated and installed in a minimum time to avoid extension of the repair outage.

To overcome this problem, gravity wedge supports have been previously used at locations where clearances have developed in restrainer bracket contacts. The gravity wedge support employed a sliding wedge and a fixed bracket mount that engaged the jet pump restrainer bracket. These gravity wedges were only applicable to restrainer bracket/inlet mixer gap widths from about 1.0 to 2.0 inches, as space was required for a wedge with sufficient weight to give the desired support load. Another solution employed spring wedge supports at locations where clearances have developed and the restrainer bracket design did not allow adequate access space for a gravity actuated wedge. Both these types of wedges required significant fabrication, which had to be performed in advance of the installation to avoid extension of the reactor outage length. Also these wedges made use of guide ear and gusset features of the restrainer bracket for locating the wedge. However, guide ear and gusset features are not present on restrainer bracket designs for some plants.

SUMMARY OF INVENTION

In one aspect, a piping support wedge apparatus for a jet pump in a nuclear reactor is provided. The wedge apparatus includes a first tapered wedge segment having a first end portion and a second end portion and a second tapered wedge segment having a first end portion and a second end portion. The first and second wedge segments are joined at the first ends portions to form a substantially U-shaped body. The wedge apparatus also includes a slot defined by an area between the first and second wedge segments and extending from the first end portions to the joined second end portions of the wedge segments.

In another aspect, a nuclear reactor jet pump assembly is provided that includes an inlet mixer, a diffuser coupled to the inlet mixer by a slip joint, a restrainer bracket having at least one set screw engagable with said inlet mixer, and a piping support wedge apparatus positioned between the restrainer bracket and the inlet mixer. The wedge apparatus includes a first tapered wedge segment having a first end portion and a second end portion and a second tapered wedge segment having a first end portion and a second end portion. The first and second wedge segments are joined at the first ends portions to form a substantially U-shaped body. The wedge apparatus also includes a slot defined by an area between the first and second wedge segments and extending from the first end portions to the joined second end portions of the wedge segments.

In another aspect, a method of restoring a tight rigid fit between an inlet mixer and an adjacent restrainer bracket in a nuclear reactor pressure vessel is provided. The restrainer bracket is coupled to a jet pump riser pipe and includes at least one set screw. The method includes inserting a piping support wedge apparatus between the restrainer bracket and the inlet mixer, and compressing the wedge apparatus around the restrainer bracket set screw. The wedge apparatus includes a first tapered wedge segment having a first end portion and a second end portion and a second tapered wedge segment having a first end portion and a second end portion. The first and second wedge segments are joined at the first ends portions to form a substantially U-shaped body. The wedge apparatus also includes a slot defined by an area between the first and second wedge segments and extending from the first end portions to the joined second end portions of the wedge segments.

DETAILED DESCRIPTION

A piping support wedge apparatus is described below in more detail. The wedge apparatus is sized to be installed in the space between restrainer bracket and a jet pump inlet mixer straddling an existing restrainer bracket set screw. The wedge apparatus is used to restore the tight and rigid fitup provided between the inlet mixer and the adjacent restrainer bracket, replacing the support function of an existing set screw contact. The wedge apparatus is remotely installable by attachment to the existing restrainer bracket, is captured by the set screw to prevent its escape into the reactor system, and requires minimum installation time without disassembly of the jet pump. The wedge apparatus is of simple construction and requires a minimum fabrication cycle after its need and approximate required thickness are identified during a reactor outage thereby avoiding extended reactor outages. Also, the wedge support apparatus is designed for application at locations where clearances have developed between the inlet mixer and the adjacent restrainer bracket, and where the restrainer bracket design does not have guide ear and gusset features, and does not permit adequate access space for a gravity actuated wedge.

Figure 1:
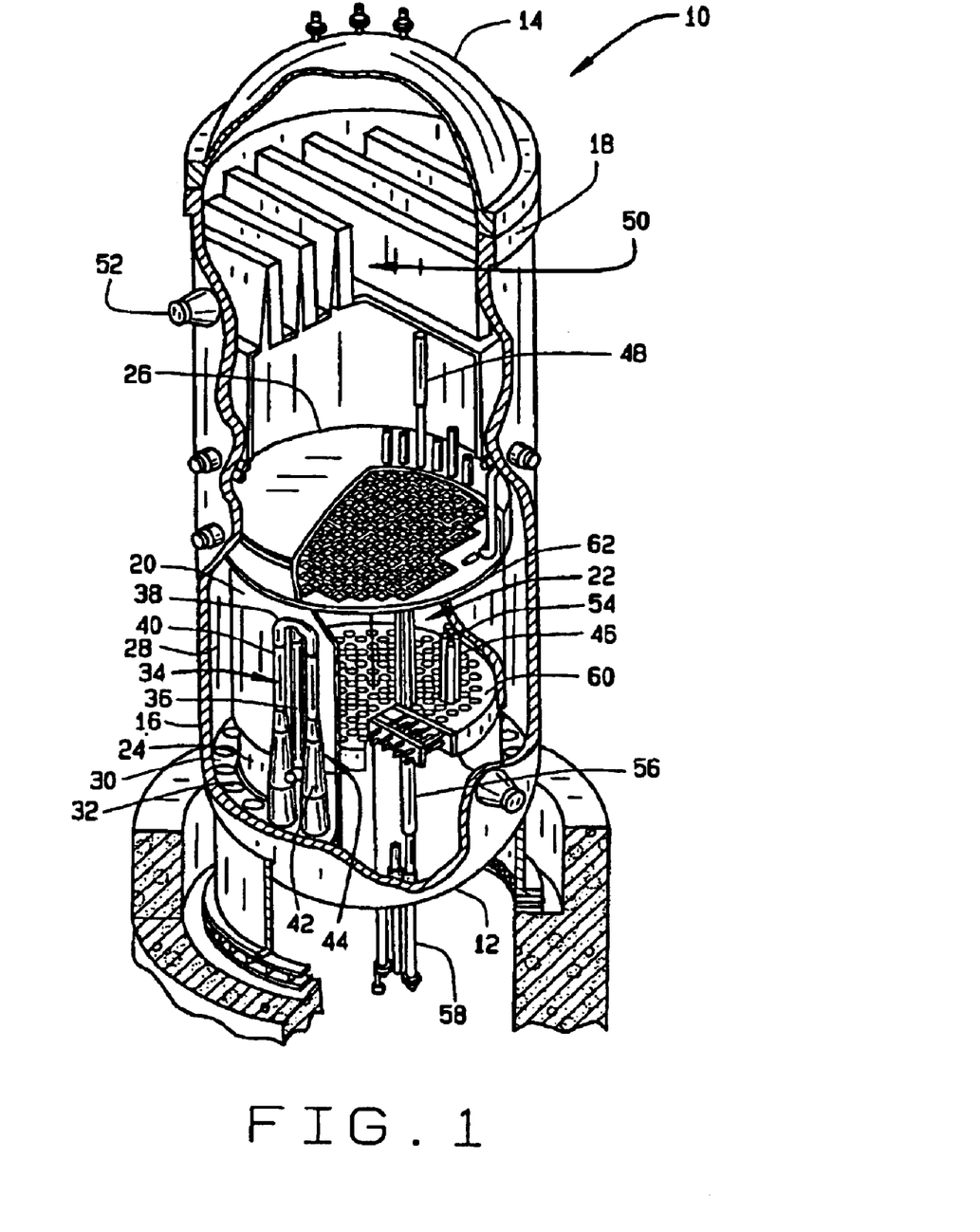
FIG. 1 is a sectional view, with parts cut away, of a boiling water nuclear reactor pressure vessel.

Referring to the drawings, FIG. 1 is a sectional view, with parts cut away, of a boiling water nuclear reactor pressure vessel (RPV) 10. RPV 10 has a generally cylindrical shape and is closed at one end by a bottom head 12 and at its other end by a removable top head 14. A side wall 16 extends from bottom head 12 to top head 14. Side wall 16 includes a top flange 18. Top head 14 is attached to top flange 18. A cylindrically shaped core shroud 20 surrounds a reactor core 22. Shroud 20 is supported at one end by a shroud support 24 and includes a removable shroud head 26 at the other end. An annulus 28 is formed between shroud 20 and side wall 16. A pump deck 30, which has a ring shape, extends between shroud support 24 and RPV side wall 16. Pump deck 30 includes a plurality of circular openings 32, with each opening housing a jet pump 34. Jet pumps 34 are circumferentially distributed around core shroud 20. An inlet riser pipe 36 is coupled to two jet pumps 34 by a transition assembly 38. Each jet pump 34 includes an inlet mixer 40, a diffuser 42, and a tailpipe assembly 43. Inlet riser 36 and two connected jet pumps 34 form a jet pump assembly 44.

Thermal power is generated within core 22, which includes fuel bundles 46 of fissionable material. Water circulated up through core 22 is at least partially converted to steam. Steam separators 48 separates steam from water, which is recirculated. Residual water is removed from the steam by steam dryers 50. The steam exits RPV 10 through a steam outlet 52 near vessel top head 14.

The amount of thermal power generated in core 22 is regulated by inserting and withdrawing control rods 54 of neutron absorbing material, such as for example, boron carbide. To the extent that control rod 54 is inserted into core 22 between fuel bundles 46, it absorbs neutrons that would otherwise be available to promote the chain reaction which generates thermal power in core 22. Control rod guide tubes 56 maintain the vertical motion of control rods 54 during insertion and withdrawal. Control rod drives 58 effect the insertion and withdrawal of control rods 54. Control rod drives 58 extend through bottom head 12.

Fuel bundles 46 are aligned by a core plate 60 located at the base of core 22. A top guide 62 aligns fuel bundles 46 as they are lowered into core 22. Core plate 60 and top guide 62 are supported by core shroud 20.

Figure 2:
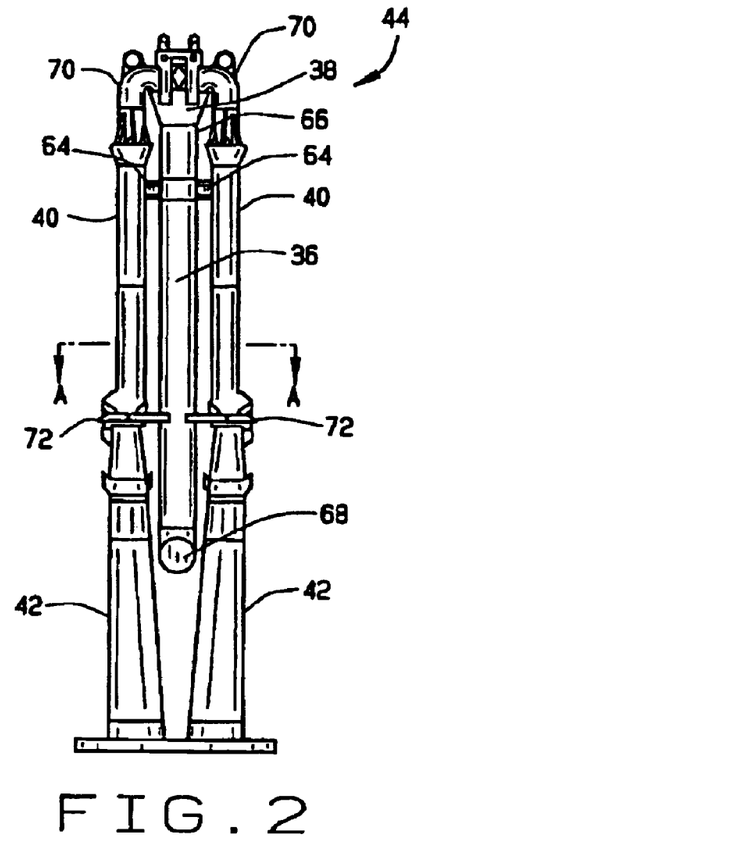
FIG. 2 is a side view of a jet pump assembly shown in FIG. 1.

FIG. 2 is a side view of jet pump assembly 44. Water flows through jet pump assembly 44 and into reactor core 22 (shown in FIG. 1). Jet pump assembly 44 includes riser assembly 36. transition assembly 38, and two jet pumps 34 each having an inlet mixer assembly 40, and a diffuser assembly 42. Particularly, riser assembly 36 is supported by riser braces 64 which couple riser 36 to reactor vessel 10 (shown in FIG. 1). Transition assembly 38 is coupled to the upper end 66 of riser 36 to split the flow of water into two paths, one through each jet pump 34. Water enters riser assembly 36 through jet pump inlet nozzle 68. Inlet mixers 40 are coupled at one end to transition piece 38 by elbows 70, and at an opposite end to jet pump diffuser assemblies 42. For support and to prevent pipe vibrations, restrainer brackets 72 couple inlet mixer assemblies 40 to riser pipe 36.

Figure 3:
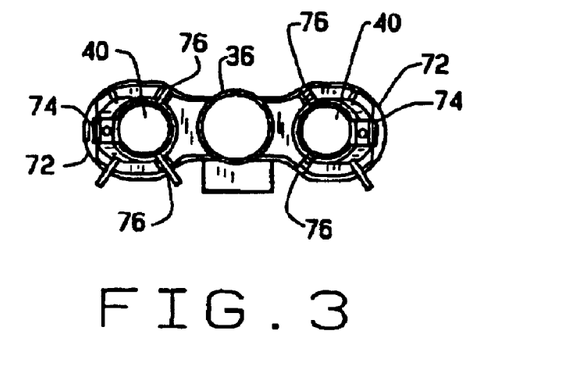
FIG. 3 is a cross sectional view through line A—A of the jet pump assembly shown in FIG. 2.

Referring also to FIG. 3, gravity wedges 74 are positioned between restrainer brackets 72 and inlet mixers 40. Set screw contacts 76 extend through restrainer brackets 72 and contact mixers 40 to provide a tight rigid fitup. Typically set screws 76 are tack welded to restrainer brackets 72 to prevent set screws 76 from loosening. However, because of the severe conditions present in the reactor vessel, the jet pump assembly alignment may change, which can loosen the tight rigid fit-up of inlet mixers 40 in restrainer brackets 72. Without a rigid fit-up, inlet mixers 40 can vibrate which is an undesirable condition.

Figure 4:
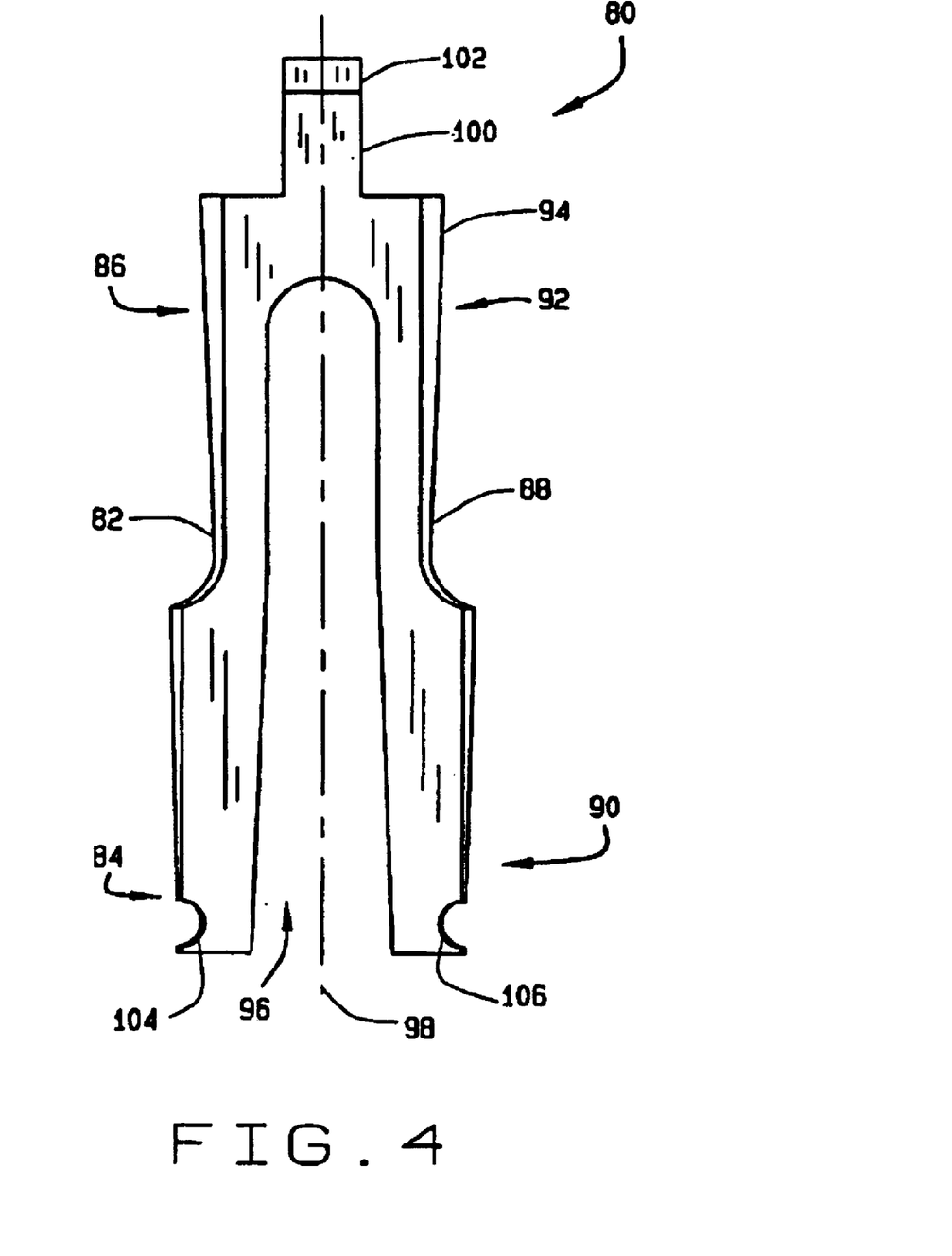
FIG. 4 is a front view of a wedge apparatus in accordance with an embodiment of the present invention.
Figure 5:
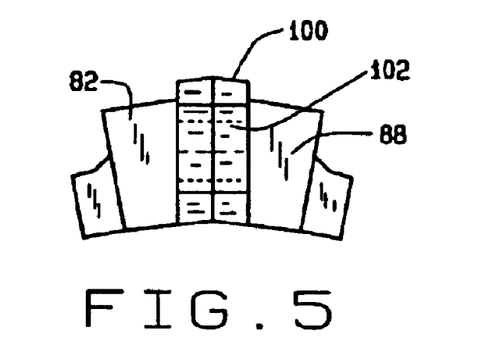
FIG. 5 is a top view of the wedge apparatus shown in FIG. 4.
Figure 6:
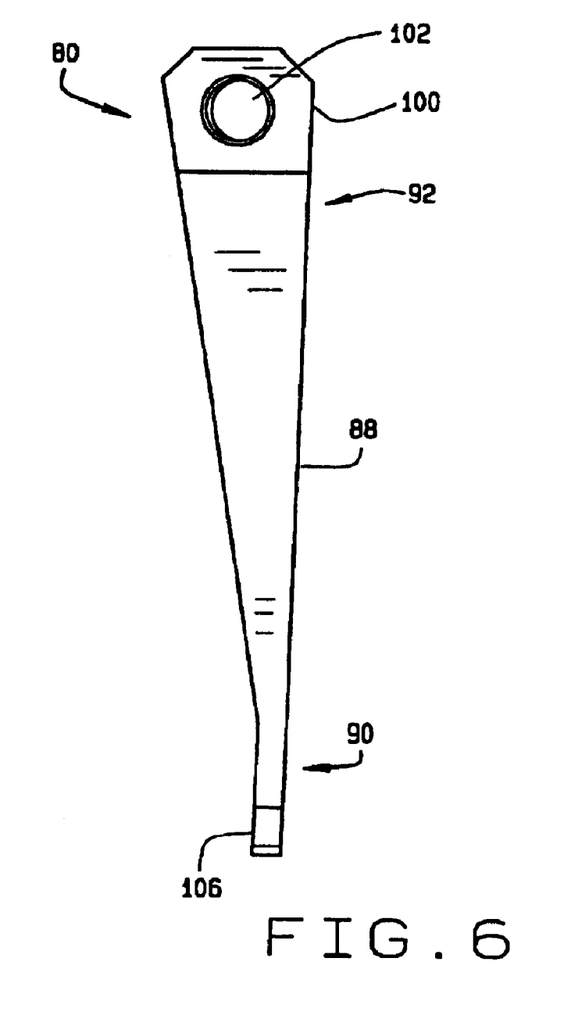
FIG. 6 is a side view of the wedge apparatus shown in FIG. 4.

FIG. 4 is a front view of a wedge apparatus 80 in accordance with an embodiment of the present invention. FIG. 5 is a top view of wedge apparatus 80 and FIG. 6 is a side view of wedge apparatus 80. Referring to FIGS. 4, 5, and 6, wedge apparatus 80 includes, in an exemplary embodiment, a first tapered wedge segment 82 having a first end portion 84 and a second end portion 86, and a second tapered wedge segment 88 having a first end portion 90 and a second end portion 92. First and second wedge segments 82 and 88 are joined at second end portions 86 and 92 to form a substantially U-shaped body 94. Wedge apparatus 80 also includes a slot 96 defined by the area between first and second wedge segments 82 and 88. Slot 96 extends from first end portions 84 and 90 to joined second end portions 86 and 92 of wedge segments 82 and 88. Slot 96 is sized to receive restrainer bracket set screw 76.

Tapered wedge segments 82 and 88 are rotated with respect to each other about the longitudinal axis 98 of apparatus 80. This relationship of wedge segments 82 and 88 permit seating in the annular space between inlet mixer 40 and restrainer bracket 72. The wedge angle and length of wedge segments 82 and 88 is selected to permit fitup over a range of vertical positions and compensates for the annular gap width between restrainer bracket 72 and inlet mixer 40 (shown in FIGS. 2 and 3). Before installation in jet pump 34, wedge segments 82 and 88 are substantially parallel to each other. Particularly, the longitudinal axis of wedge segment 82 is substantially parallel to the longitudinal axis of wedge segment 88.

A lug 100 extends from wedge body 94 and includes a handling bore 102 extending therethrough that is sized to interface with a tool manipulator, such as a handling pole. First end portions 84 and 90 of wedge segments 82 and 88 include notches 104 and 106 respectively. Notches 104 and 106 are sized for engagement with a pliers-type installation tool (not shown).

Figure 7:
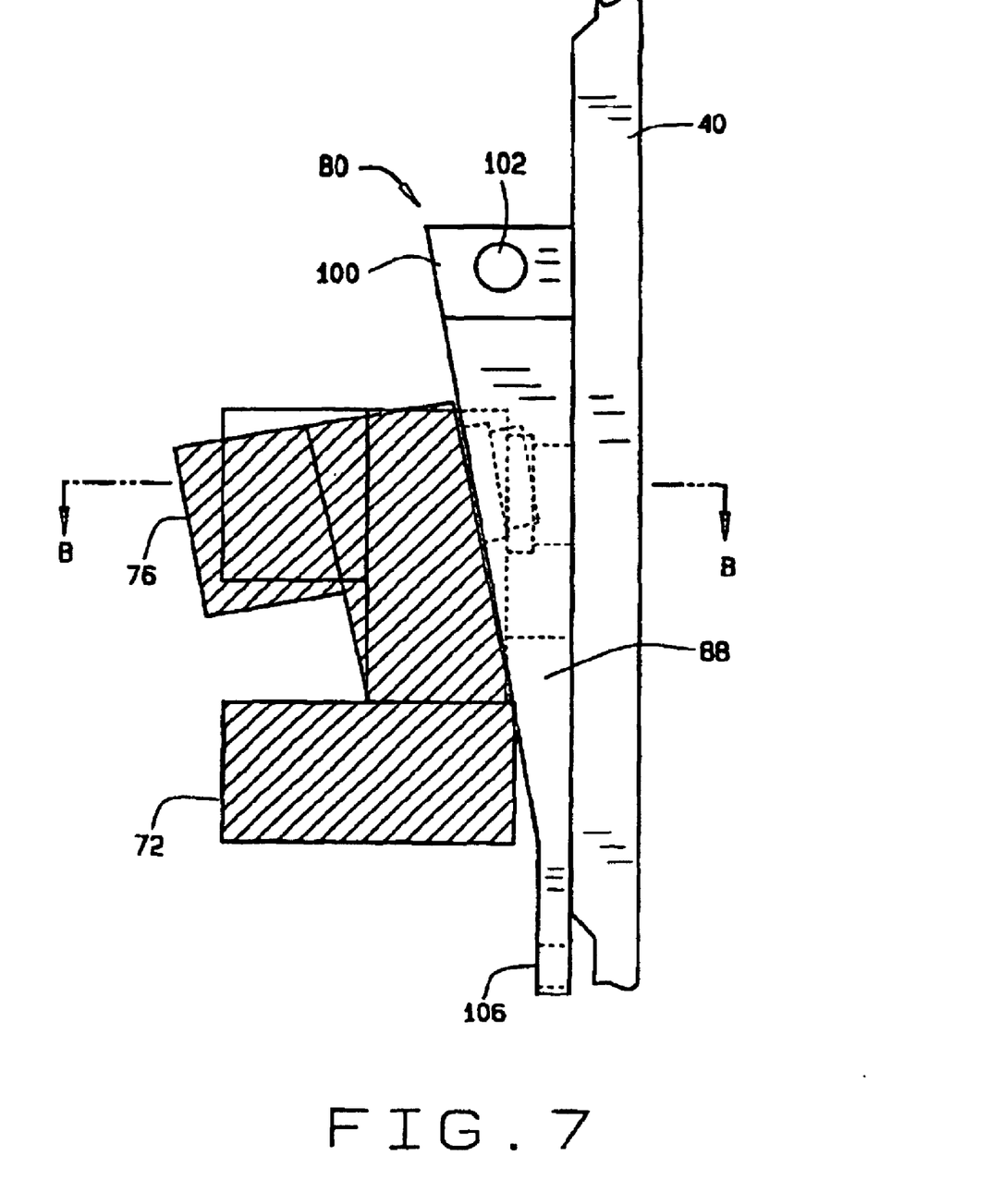
FIG. 7 is a side view of wedge apparatus installed in a jet pump shown in FIG. 1.
Figure 8:
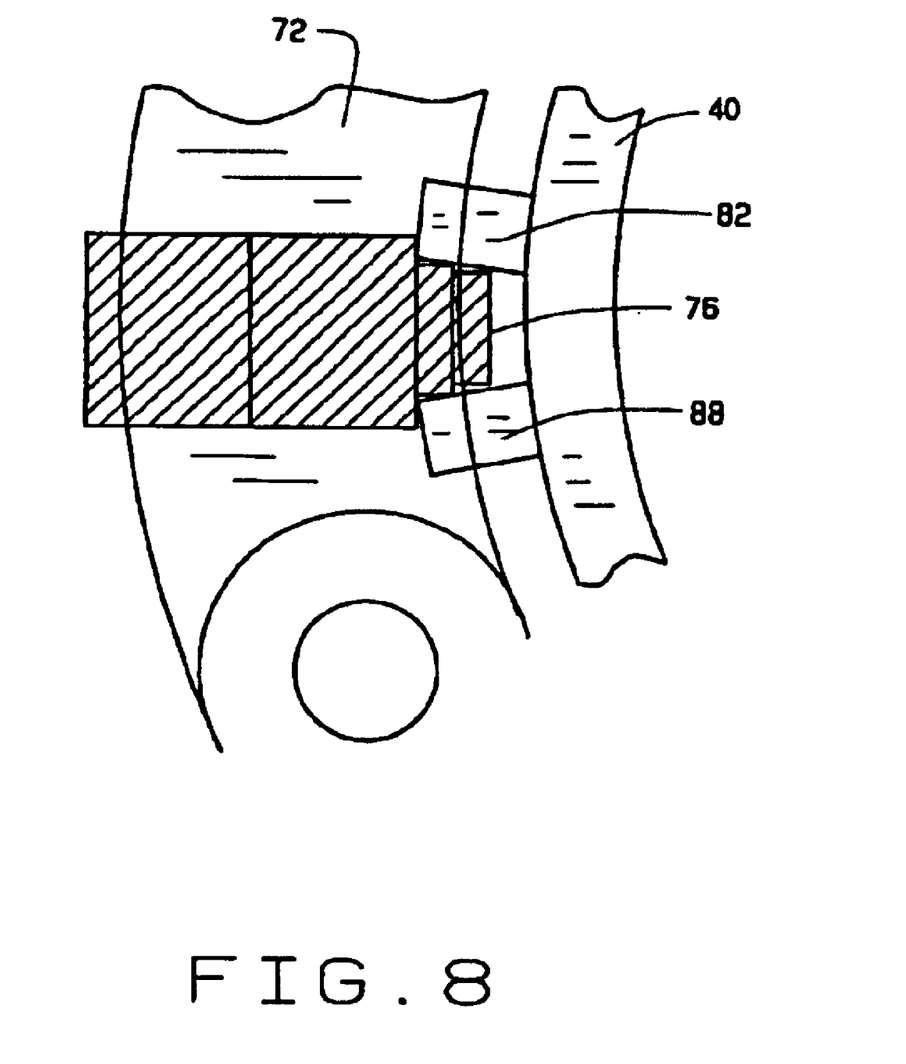
FIG. 8 is a cross sectional view through line B—B of the wedge apparatus installed in a jet pump as shown in FIG. 7.
Figure 9:
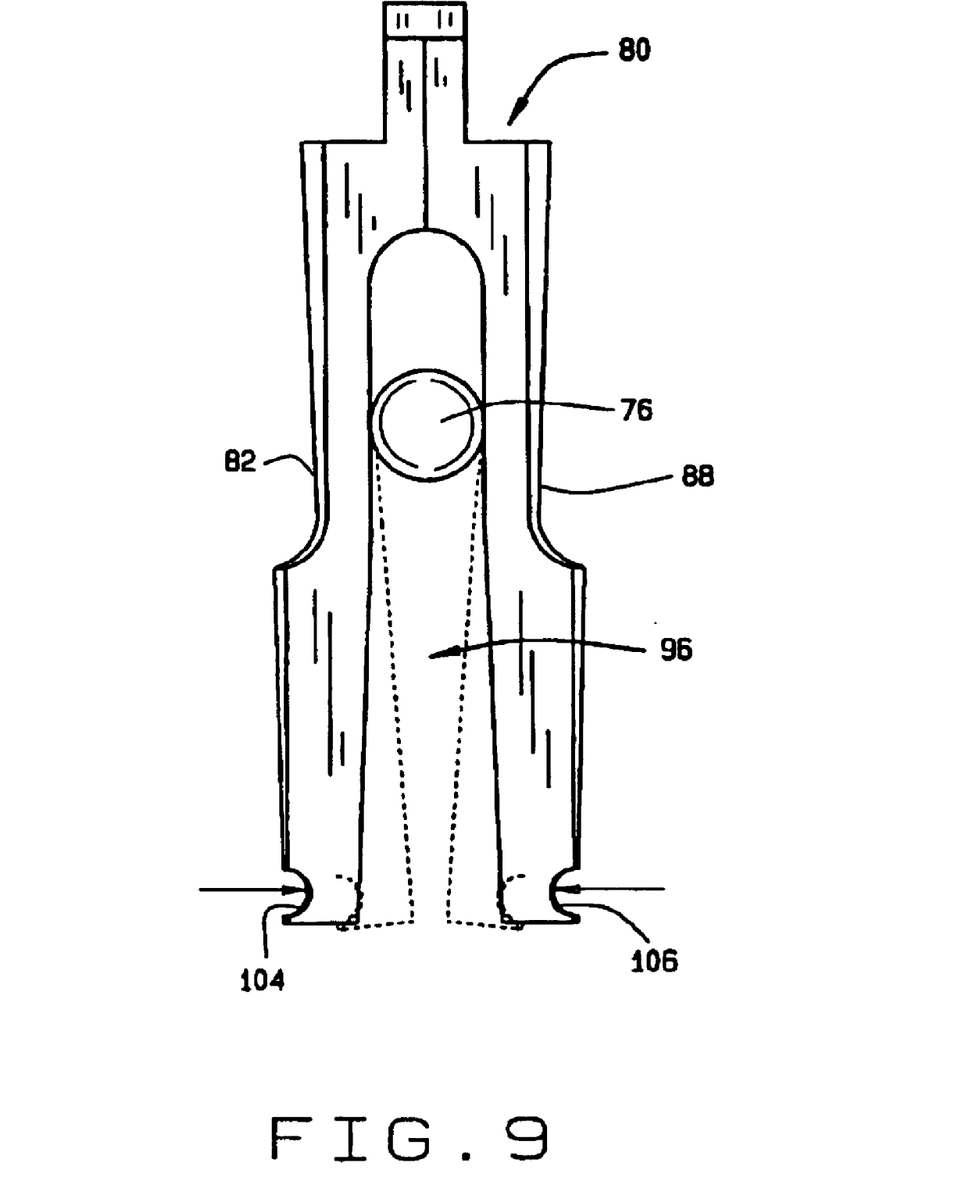
FIG. 9 is a is a front view of the wedge apparatus shown in FIG. 4 showing wedge segment deformation around a set screw.

Referring also to FIGS. 7, 8 and 9, during installation, wedge apparatus 80 hangs vertically for a handling pole (not shown) that is engaged with handling bore 102. Wedge apparatus 80 is lowered into position between restrainer bracket 72 and inlet mixer 40, straddling set screw 76. Particularly, set screw 76 is received into slot 96 of wedge body 94.

A pliers-type installation tool (not shown) engages notches 104 and 106 located in first end portions 84 and 90 of wedge segments 82 and 88 and compresses the two end portions together, and pulls wedge apparatus 80 downward along the shallow angled taper of wedge segments 82 and 88 into tight contact between inlet mixer 40 and restrainer bracket 72. The taper and cross section of wedge segments 82 and 88 are selected so compression of the two ends causes maximum bending and yielding where wedge segments 82 and 88 are squeezed into contact against set screw 76. Wedge segments 82 and 88 are thus permanently deformed around set screw 76 (see FIG. 9), capturing wedge apparatus 80 so it cannot become a loose part, and so wedge apparatus 80 cannot move upward along the taper to loosen or azimuthally from the desired location. Wedge apparatus 80 then forms a rigid spacer in tight contact between inlet mixer 40 and restrainer bracket 72.

While the invention has been described in terms of various specific embodiments, those skilled in the art will recognize that the invention can be practiced with modification within spirit and scope of the claims.

What is claimed is:

1. A piping support wedge apparatus for a jet pump in a nuclear reactor, said wedge apparatus comprising:
    a first tapered wedge segment comprising a first end portion and a second end portion;
    a second tapered wedge segment comprising a first end portion and a second end portion, said first and second wedge segments joined at said second end portions to form a substantially U-shaped body, said first and second tapered wedge segments rotated with respect to each other along a longitudinal axis of said apparatus; and
    a slot defined by an area between said first and second wedge segments and extending from said first end portions to said joined second end portions of said wedge segments.

2. A wedge apparatus in accordance with claim 1 further comprising a lug extending from said joined second end portions of said wedge segments, said lug comprising a bore extending therethrough.

3. A wedge apparatus in accordance with claim 1 further comprising a notch in said first end portions of said first and said second wedge segments.

4. A wedge apparatus in accordance with claim 1 wherein a longitudinal axis of said first wedge segment and a longitudinal axis of said second wedge segment are substantially parallel.

5. A nuclear reactor jet pump assembly comprising:
    an inlet mixer,
    a diffuser coupled to said inlet mixer by a slip joint;
    a restrainer bracket comprising at least one set screw engagable with said inlet mixer, and
    a piping support wedge apparatus positioned between said restrainer bracket and said inlet mixer, said wedge apparatus comprising:
        a first tapered wedge segment comprising a first end portion and a second end portion;
        a second tapered wedge segment comprising a first end portion and a second end portion, said first and second wedge segments joined at said second end portions to form a substantially U-shaped body, said first and second tapered wedge segments rotated with respect to each other along a longitudinal axis of said apparatus; and
        a slot defined by an area between said first and second wedge segments and extending from said first end portions to said joined second end portions of said wedge segments.

6. A jet pump assembly in accordance with claim 5 wherein said wedge apparatus further comprises a lug extending from said joined second end portions of said wedge segments, said lug comprising a bore extending therethrough.

7. A jet pump assembly in accordance with claim 5 wherein said wedge apparatus further comprises a notch in said first end portions of said first and said second wedge segments.

8. A jet pump assembly in accordance with claim 5 wherein a longitudinal axis of said first wedge segment and a longitudinal axis of said second wedge segment are substantially parallel.

9. A jet pump assembly in accordance with claim 5 wherein said slot is sized to receive a restrainer bracket set screw.

10. A jet pump assembly in accordance with claim 9 wherein said first and second wedge segments are deformable around a restrainer bracket set screw.

* * * * *